United States Patent [19]
Derby et al.

[11] Patent Number: 5,822,328
[45] Date of Patent: Oct. 13, 1998

[54] FRAME SYNCHRONIZATION MECHANISM FOR DIGITAL SIMULTANEOUS VOICE/DATA MODEMS

[75] Inventors: Jeffrey Haskell Derby, Chapel Hill, N.C.; Aharon Satt, Haifa; Uzi Shvadron, Mitzpe Aviv, both of Israel

[73] Assignee: International Business Machines Corporation, Armonk, N.Y.

[21] Appl. No.: 647,537

[22] Filed: May 15, 1996

[51] Int. Cl.⁶ ........................................................ H04J 3/06
[52] U.S. Cl. ........................ 370/507; 370/510; 375/222; 375/368
[58] Field of Search ................................ 370/503, 507, 370/509, 498, 510, 512, 513, 514, 435, 535, 442; 375/222, 260, 354, 340, 356, 362, 368

[56] References Cited

U.S. PATENT DOCUMENTS

| | | | |
|---|---|---|---|
| 4,594,708 | 6/1986 | Servel et al. | 370/503 |
| 4,644,536 | 2/1987 | Utsumi | 370/509 |
| 4,740,961 | 4/1988 | Renner | 370/507 |
| 4,893,305 | 1/1990 | Fernandez et al. | 370/514 |
| 4,930,125 | 5/1990 | Bains | 375/368 |
| 5,056,119 | 10/1991 | Sakalian et al. | 375/368 |
| 5,408,475 | 4/1995 | Lee | 371/20.4 |

*Primary Examiner*—Chau Nguyen
*Attorney, Agent, or Firm*—Steven B. Phillips

[57] ABSTRACT

A time-division multiplexing synchronization mechanism employs a 1-bit/frame framing channel with a pattern that repeats every 2 frames. Acquisition and reacquisition of synchronization with such a framing pattern is enabled through the use of an explicit synchronization procedure. With this procedure, initial acquisition of frame synchronization as well as reframing after loss of synchronization are carried out while the transmission channel is carrying only a predefined bit pattern. When the receivers are in synchronization, synchronization is monitored and maintained using a 1-bit/frame framing channel, while the communications link is carrying multiplexed bit streams with the appropriate format.

21 Claims, 8 Drawing Sheets

FRAME SYNCHRONIZATION MECHANISM FOR DIGITAL SIMULTANEOUS VOICE/DATA MODEMS

TECHNICAL FIELD

The present invention relates in general to data transmission, and in particular, to frame synchronization for time-division multiplexing of data.

BACKGROUND INFORMATION

Time-division multiplexing ("TDM") is an established technique that permits several independent bitstreams to be carried over a single transmission channel. With TDM, the aggregate transmitted bitstream is organized into fixed-length frames, with each frame subdivided into channels. An example is shown in FIG. 1, where the channels are identified by their position in the frame. The transmitting and receiving ends share a common understanding (established by configuration or some communication between them) of the position of each channel in the frame and the number of bits allocated to each channel in the frame. Assuming that the receiving end can identify the start of each frame, it can easily find the start of each channel slot and thus demultiplex the channels.

A framing channel, labeled "F" in FIG. 1, provides the means by which the receiver identifies the start of each frame. Generally, the framing channel carries a bit pattern that is known to the receiver. This bit pattern may be the same in each frame, or it may extend over a number of frames; it repeats every K frames, with K=1 in the former case and K>1 in the latter.

Functions associated with the framing channel include:

Acquisition of frame synchronization (also referred to herein as "sync"); i.e., determination by the receiver at start-up of the location of the framing channel.

Maintenance of frame synchronization, i.e. continued proper identification of the framing channel, in the presence of occurrences of all or part of the framing bit pattern elsewhere in the frame.

Maintenance of frame synchronization in the presence of bit errors.

Reacquisition of frame synchronization following a severe error burst, during which synchronization had been lost.

These functions are collectively performed by a frame synchronization algorithm.

TDM has been used primarily in medium-rate to high-rate digital transmission systems. These include ISDN basic access at 160 kbits/s, United States (TI) 24-channel systems and European (El) 30-channel systems at 1544 kbits/s and 2048 kbits/s, respectively, and through SONET optical systems at 150 Mbits/s and up.

Recently, TDM has been suggested as a means for multiplexing several bitstreams (in particular, voice and data) over analog modem channels operating at speeds as low as 14.4 kbits/s. This application is referred to as voice-over-data (VoD) or simultaneous voice-data (SVD).

A set of requirements for the framing channel and frame synchronization algorithm for this application of TDM is the following:

1. The bandwidth occupied by the framing channel must be as small as possible, consistent with the achievement of reasonable acquisition time and reframe time. Ideally, this bandwidth should be no more than 1 bit per frame. This follows from the fact that the overall transmission channel bandwidth is very small to begin with.

2. The aggregate bandwidth must carry information transparently with no multiplexing prior to initialization and synchronization of the TDM format. This is because the selection of the basic SVD capability, as well as characteristics of the SVD capability, are negotiated between the modems on a per-call basis, at the start of the call or even during the call.

3. The frame synchronization algorithm and other functions of the framing channel should be realizable without special hardware.

4. The framing pattern should be relatively short. Long framing patterns lead to very long acquisition and reframe times, because several cycles of the framing pattern must be observed before the demultiplexer can be considered "in sync." In addition, while long framing patterns can be detected easily in dedicated hardware (e.g., using shift registers and compare logic), their detection in a programmable processor is generally processing-intensive.

While TDM systems are well-known and common in digital telephony, none of the existing synchronization mechanisms is cable of meeting these requirements. Therefore, what is needed in the art is a frame synchronization mechanism that meets the above requirements.

SUMMARY OF THE INVENTION

The present invention provides a TDM synchronization mechanism that employs a 1 bit/frame framing channel, with a pattern that repeats every 2 frames (i.e., 01010101 . . . ). Reliable acquisition and reacquisition of synchronization with such a simple framing pattern are enabled through the use of an explicit synchronization procedure. With this procedure, initial acquisition of frame synchronization as well as reframing after loss of synchronization are carried out while the transmission channel is carrying only a predefined bit pattern; in other words, the bandwidth employed for both initial synchronization and reframing after loss of synchronization is the entire aggregate bandwidth of the transmission link. When the receivers are "in sync," synchronization is monitored and maintained using the 1 bit/frame framing channel, while the link is carrying multiplexed bit streams with the appropriate format.

Advantages of the synchronization mechanism of the present invention are:

Transition from transparent, "clear channel" operation to explicit sync mode.

Transition from explicit sync mode to multiplexed, SVD mode.

Transition from multiplexed mode to explicit sync mode for reframing, in the event of sync loss.

Transition from explicit sync mode to transparent operation in the event frame sync is irretrievably lost.

Maintenance of communication between control functions in the modems throughout the explicit sync process.

The present invention is realized through the use of simple state machines that permit each receiver/demultiplexer to keep track of the state of its peer (at the other end). The description that follows is in the context of SVD modems; it should be kept in mind, however, that the synchronization procedure of the present invention has more general applicability.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
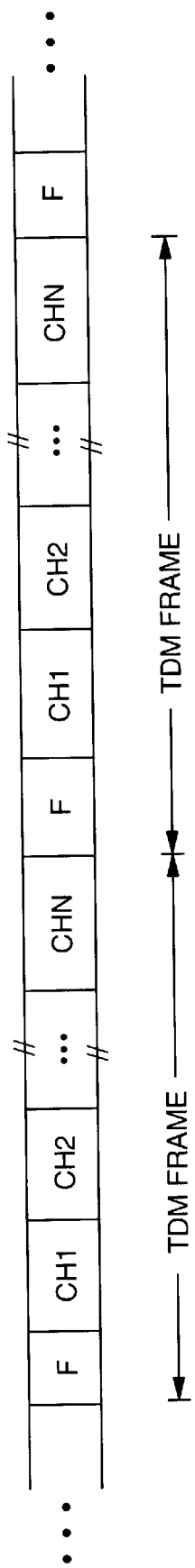
FIG. 1 illustrates a TDM frame structure with N information channels.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
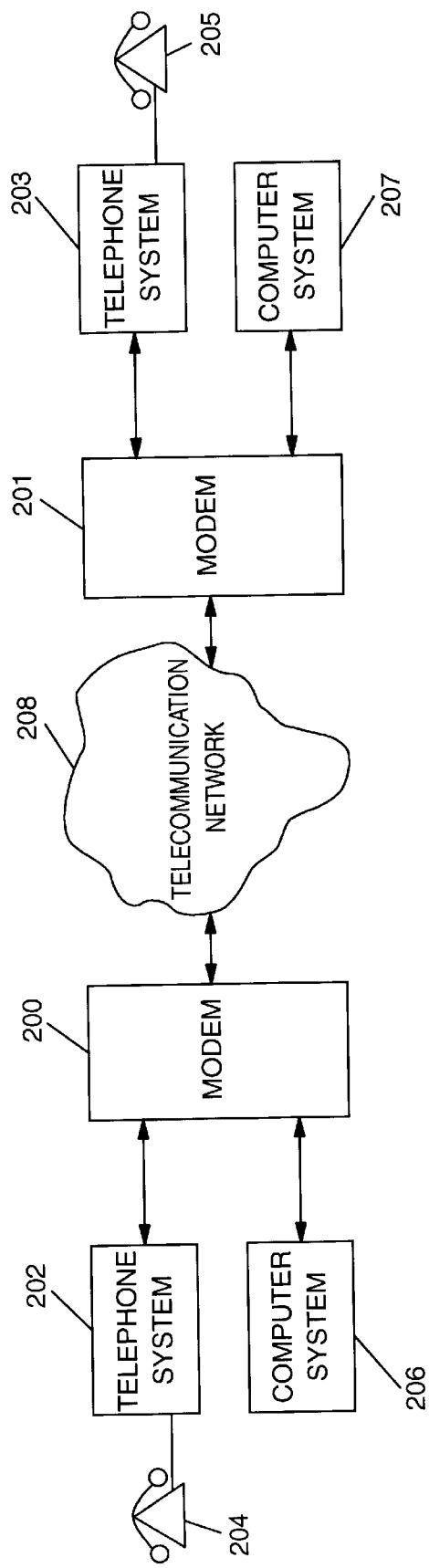
FIG. 2 illustrates, in block diagram form, a telecommunication system implementing the present invention.

Referring to FIG. 2, there is illustrated a telecommunications network implementing an embodiment of the present invention. Modems 200 and 201 may be simultaneous voice-data ("SVD") modems. However, the present invention is also applicable for a telecommunications system employing any type of apparatus using time-division multiplexing ("TDM") as a means for transmitting data from a transmitter to a receiver.

Modem 200 may receive voice signals from telephone system 202 having telephone 204 coupled thereto. Modem 200 may also receive data signals from computer system 206. Likewise, modem 201 communicates with telephone system 203 coupled to telephone 205, and to computer system 207. Naturally, more than one telephone system and/or computer system may be coupled to either or both of modems 200 and 201. Furthermore, the type of telephone system or computer system is not of importance to describing the present invention. For example, telephone sets 204 and/or 205 could also be comprised of speakerphone setups with a mike and speaker (or headset) with no actual physical telephone set.

Modems 200 and 201 communicate with each other using TDM through telecommunications network 208, which may be a private network or may be all or a portion of a public telephone network.

Figure 3:
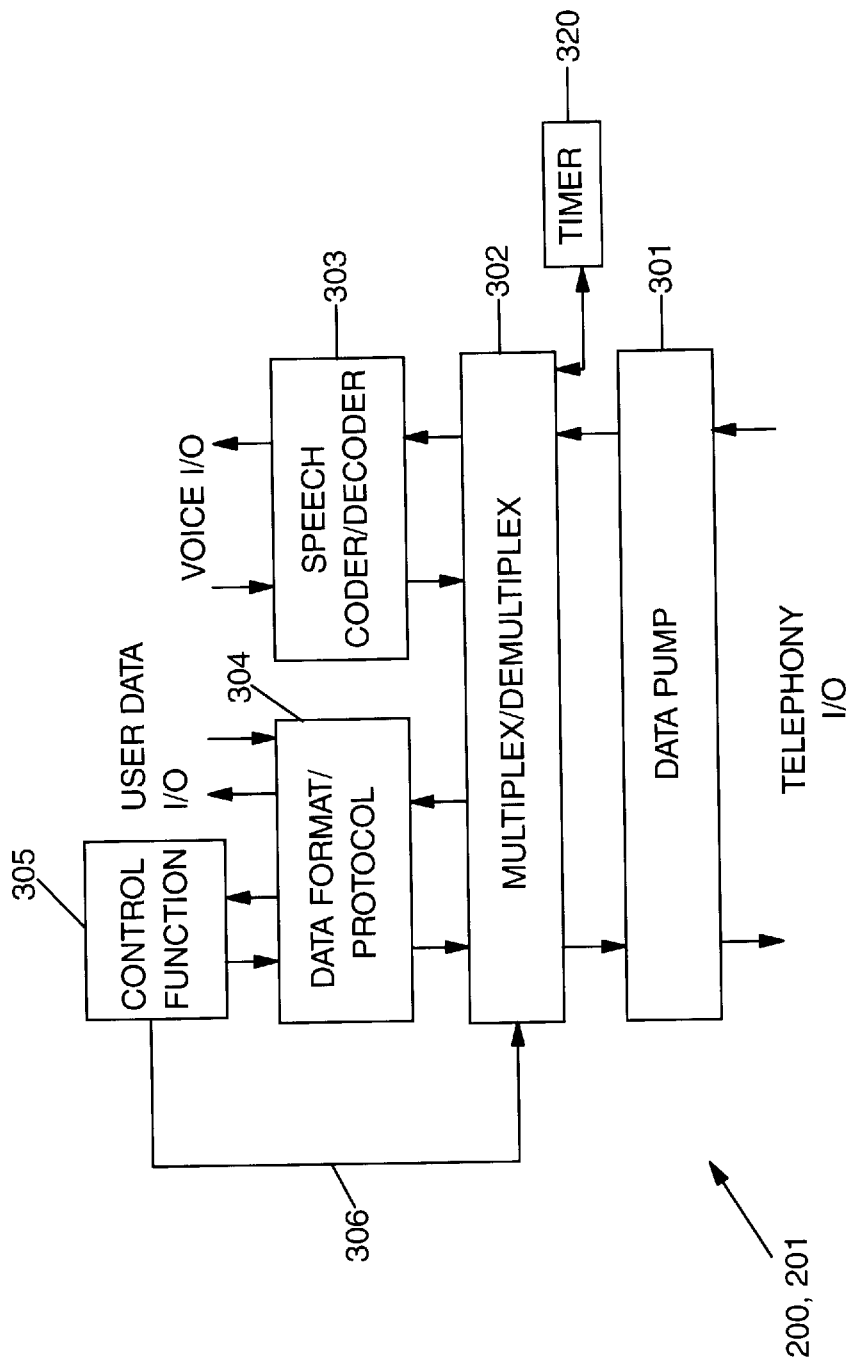
FIG. 3 illustrates, in block diagram form, a voice-over-data modem implementing the present invention.

Referring next to FIG. 3, there is illustrated, in block diagram form, more detail on modems 200 and 201. Data pump 301, which communicates with the telephony I/O (i.e., telecommunications network 208), includes a modulator/demodulator typically found within a modem. For a speed of 14.4 kbits/s, the modulation format might be that defined in the V.32bis standard. Alternatively, standard V.34 modulation may be used for data rates at 28.8 kbits/s.

Multiplexer/demultiplexer 302 employs a TDM mechanism using typical techniques for doing so. Multiplexer/demultiplexer 302 transmits and receives digitized data from data format/protocol circuitry 304 and speech data from speech coder/decoder 303.

Speech coder/decoder 303 operates to receive voice signals in an analog format (for example, from telephone system 202) and converts these into digital signals to be provided to multiplexer 302.

Data format/protocol circuitry 304 operates to transmit and receive user data (for example, from computer system 206). Control function circuitry 305 also communicates with data format/protocol circuitry 304. Data format/protocol circuitry 304 formats both user data and control messages using standard formats for data transmission, and may include protocols for error recovery. For example, the standard formats and protocols for ITU-T Recommendation V.42, defined for use in ordinary data modems may be employed. Control function circuitry 305 would be used in an ordinary data modem for negotiating characteristics of the user data channel (i.e., the operation of circuitry 304), e.g., whether or not data compression is employed. In the present invention, control function circuitry 305 may be used to control the operation of multiplexer/demultiplexer 302 through interface 306, and in particular the initiation of TDM mode, based on an exchange of control messages with the far-end modem.

Communications path 306 between control function circuitry 305 and multiplexer/demultiplexer 302 allows the controlling of the operation of multiplexer/demultiplexer 302 in a manner described below with respect to FIGS. 4–9.

All of the functions illustrated in FIG. 3 may be implemented within a digital signal processor.

In the following description, the multiplexer and demultiplexer portions of multiplexer/demultiplexer 302 operate under several states, which are controlled via communications path 306 by logic circuitry within control function 305. The logic circuitry within control function 305 may be configured by one skilled in the art using the state diagrams illustrated in FIGS. 4–7.

State Definitions

The multiplexer portion of multiplexer/demultiplexer 302 has the following states:

1. xtrnsp: In this state the multiplexer operates in transparent mode, i.e., it is a transparent pass-through for a single bitstream that occupies the entire physical channel.

2. xxsync: In this state the multiplexer sends the explicit synchronization pattern shown in FIG. 8. This pattern includes the correct sequence (010101 . . . ), with a period of 2 frames, in the framing-bit position (labeled as "F"). Also, as noted above, the pattern occupies the entire bandwidth of the transmission channel (or, link) between modems 200 and 201.

3. xonesf In this state, the multiplexer sends a bitstream with the correct pattern (010101 . . . ) in the framing channel and 1-bits everywhere else.

4. xonesu. In this state, the multiplexer sends a bitstream consisting of all 1-bits, with no framing (i.e., the entire physical channel is occupied by 1-bits).

5. xrmux: In this state, the multiplexer operates in normal TDM mode, sending a framed TDM bitstream with the appropriate channel structure.

The demultiplexer portion of multiplexer/demultiplexer 302 has the following states:

1. rtrnsp: In this state, the demultiplexer operates in transparent mode, i.e., it is a transparent pass-through for a single bitstream that occupies the entire physical channel.

Figure 8:
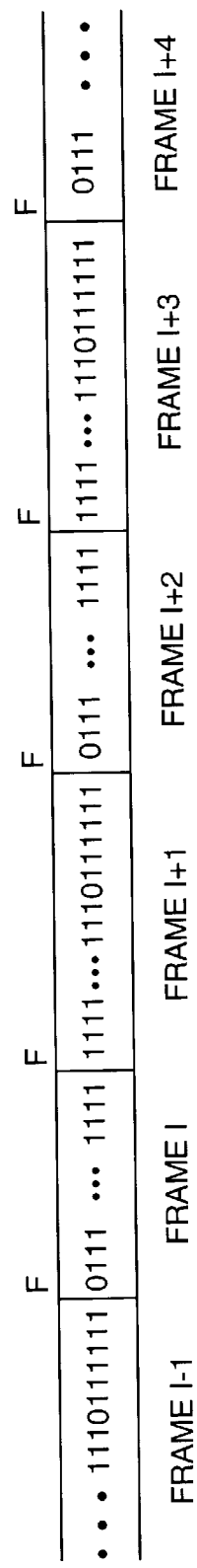
FIG. 8 illustrates a bit pattern used in the present invention.

2. rxsync., In this state, the demultiplexer attempts to synchronize to the explicit synchronization pattern shown in FIG. 8. It may do so by searching the received bitstream for occurrences of the pattern '1011111101' that are separated by exactly two frame periods. Once a sufficiently large number of such occurrences are found, with a sufficiently small number of intervening errors (e.g. out-of-place 0-bits), the demultiplexer will have acquired synchronization, identifying the location of the second 0-bit of the '1011111101' pattern as that of the framing channel. In addition, in this state the demultiplexer may pass the entire received bitstream transparently to an entity, typically a control function, such as control function 305.

3. ronesf: In this state, the demultiplexer has already acquired synchronization, and expects to receive a bitstream with the correct pattern in the framing channel and 1-bits everywhere else (i.e., the bitstream sent in state xonesf). In addition, in this state the demultiplexer may pass the entire received bitstream transparently to an entity, typically a control function, such as control function 305.

4. rmux. In this state, the demultiplexer operates in normal TDM mode, expecting a framed TDM bitstream with the appropriate channel structure. The demultiplexer checks that it remains properly synchronized by verifying that the framing bit in each frame is correct (i.e., that it alternates between 0 and 1). If a sufficient number of framing-bit errors are observed, the demultiplexer will determine that synchronization has been lost.

Initial Synchronization

Assume that an ordinary data connection has been established between modems 200 and 201, with the entire bandwidth devoted transparently to this connection in the usual way. For this example, modem 200 will be referred to as the "originator," or "sending end," and modem 201 will be referred to as the "answerer," or "receiving end"; this identification may be based on which endpoint actually originated the connection, or it may be based on some other criterion.

Consider that as a result of some exchange of control flows, modems 200 and 201 "agree" to initiate SVD mode; in the case of modems that employ V.42, this exchange may employ V.42 XID messages. These messages would flow between control function circuitry 305 and modems 200 and 201, with multiplexer/demultiplexer 302 in modems 200 and 201 operating in transparent mode. The multiplexers and demultiplexers (within multiplexer/demultiplexer 302 in both of modems 200 and 201) will then cease transparent operation and begin the initial synchronization procedure. The basic strategy employed is as follows:

Synchronization is first established in the "outbound" direction, from the originating-end multiplexer in modem 200 to the answering-end demultiplexer in modem 201.

Once the demultiplexer at the answering end has acquired sync, synchronization in the "inbound" direction is established from the answering-end multiplexer to the originating-end demultiplexer. Thus, when the originating end has acquired sync, it knows that the answering end is also in sync.

Once the demultiplexer at the originating end has acquired sync, a transition to normal multiplexed SVD operation is initiated. The transition is effected with the originating-end multiplexer sending a particular pattern for a fixed period of time.

Implementation of this strategy is now described using four simple state machines implemented in control function circuitry 305 in both of modems 200 and 201. Of the four, there is one associated with the multiplexer and one associated with the demultiplexer at each end. The possible states are those previously defined.

The initial states for all four are those associated with transparent operation; i.e., the multiplexers are initialized to be in state xtrnsp, and the demultiplexers are initialized to be in state rtrnsp.

1. As a result of a trigger (discussed in further detail below) to begin initial synchronization:

a. At the answering end (modem 201), the multiplexer remains in state xtrnsp, the demultiplexer enters state rxsync, and timer 320 is started. (Alternatively, the multiplexer could enter state xxsync).

If the demultiplexer acquires synchronization, and other local conditions are satisfied (e.g., speech coder 303 is ready to send and receive), then the demultiplexer enters state ronesf, and the multiplexer is set to enter state xxsync at the start of its next frame.

If timer 320 expires before the demultiplexer acquires synchronization, then the multiplexer and demultiplexer are both returned to transparent mode (states xtrnsp and rtrnsp, respectively).

b. At the originating end (modem 200), the multiplexer enters state xxsync, the demultiplexer enters state rxsync, and timer 320 is started.

If the demultiplexer acquires synchronization, and other local conditions are satisfied (e.g., speech coder 303 is ready to send and receive), then the demultiplexer enters state rmux, and the multiplexer is set to enter state xonesf at the start of its next frame.

If timer 320 expires before the demultiplexer acquires synchronization, then the multiplexer and demultiplexer are both returned to transparent mode (states xtrnsp and rtrnsp, respectively).

2. When the originating end (modem 200) acquires synchronization, it knows that the answering end (modem 201) has done so as well (because the answering end does not send the explicit synchronization pattern until it has first acquired synchronization). At this point:

a. The originating-end multiplexer is in state xonesf. It remains in this state for a specified number of frames, after which it enters state xmux. The originating-end demultiplexer is already in state rmux.

b. The answering-end demultiplexer is in state ronesf. In this state, it is searching for the pattern sent by the originating end while in state xonesf.

If the correct pattern is received, properly framed, for a specified number of consecutive frames (smaller than the number of frames for which the pattern is sent in state xonesf), then the demultiplexer enters state rmux, and the multiplexer is set to enter state rmux at the start of the next frame.

Otherwise, the demultiplexer determines that synchronization has been lost. The action taken in this case is described below.

3. At this point, assuming the process has completed successfully, both ends (modems 200 and 201) are operating in normal, framed TDM mode. Note that the purpose of state xonesf and corresponding state ronesf is to permit the originating end to indicate to the answering end that it has acquired synchronization, so that transmission by the answering end of the explicit sync pattern can be stopped.

Figure 4:
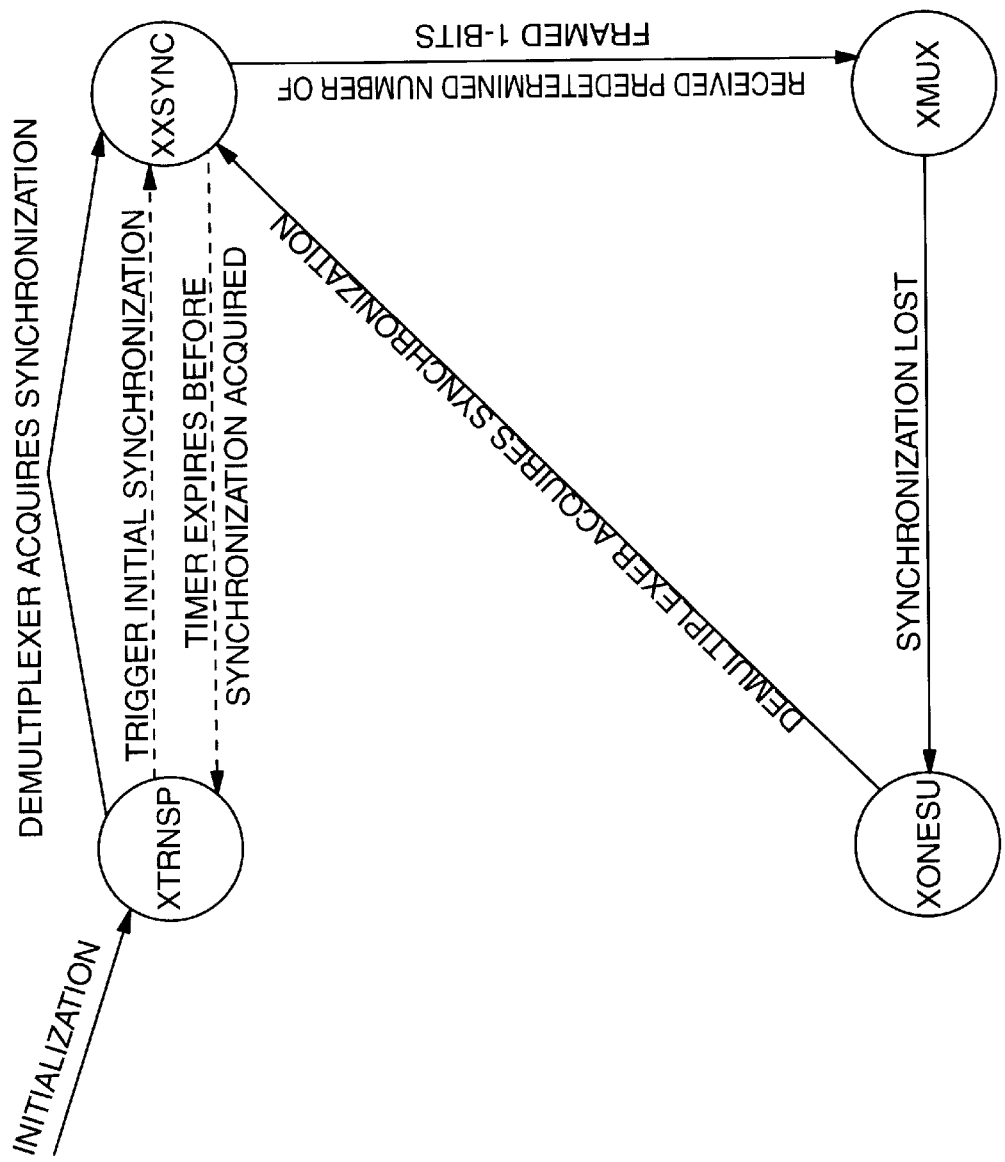
FIG. 4 illustrates a state diagram of an operation of an answering multiplexer.
Figure 5:
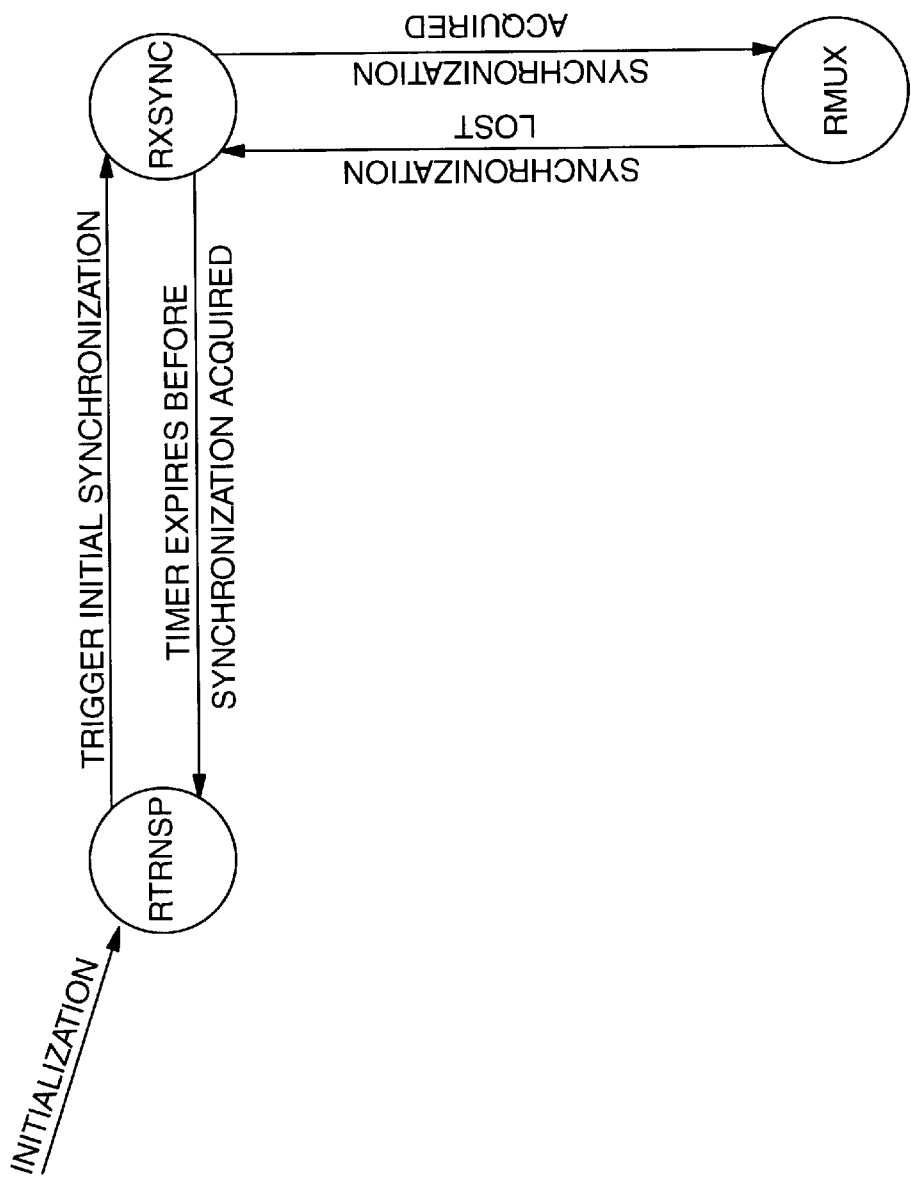
FIG. 5 illustrates a state diagram of an operation of an originating demultiplexer.
Figure 6:
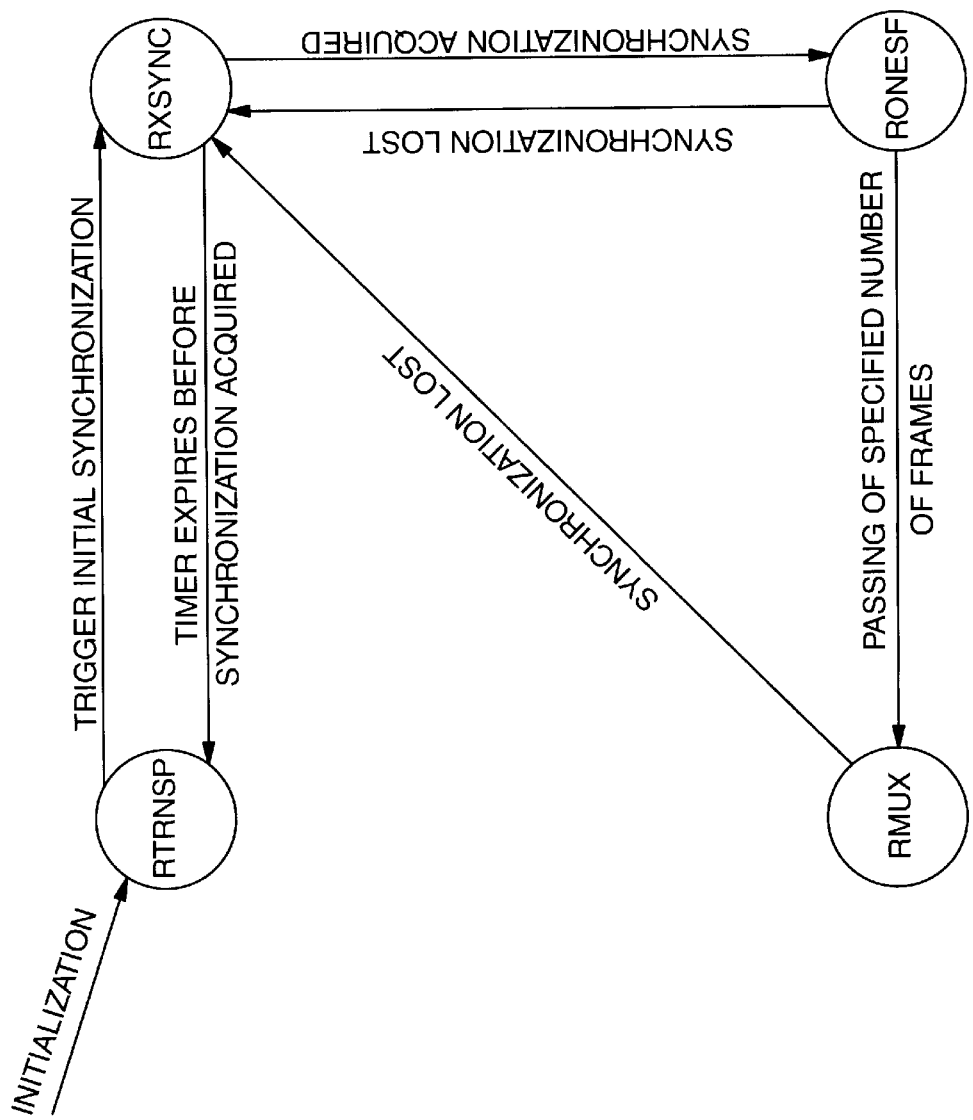
FIG. 6 illustrates a state diagram of an operation of an answering demultiplexer.
Figure 9:
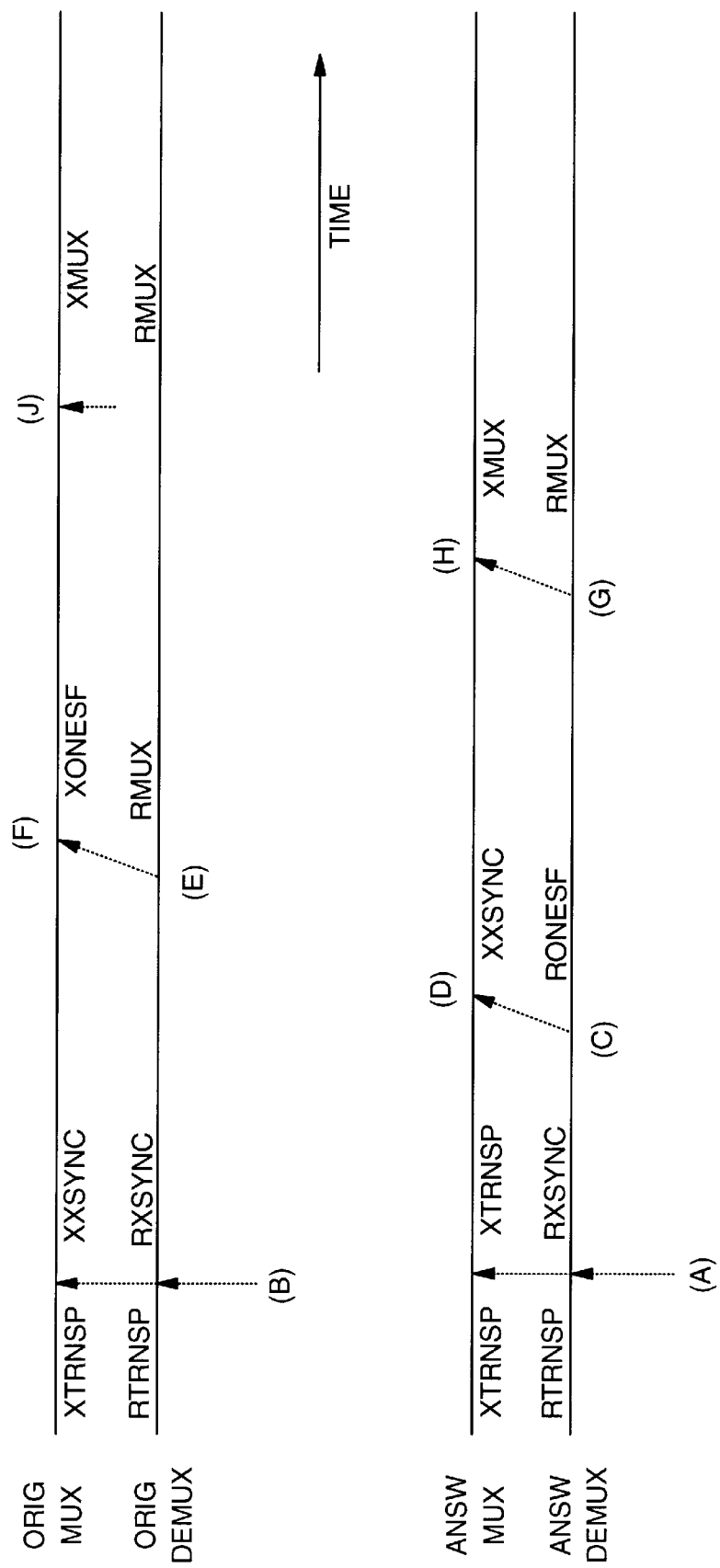
FIG. 9 illustrates a time line of the synchronization procedure of the present invention.

The process outlined above is depicted schematically in FIG. 9. Referring to FIG. 9 and the state diagrams in FIGS. 4–7, the marked time instants correspond to events as follows:

At time instant (a), the answering end (modem 201) has been triggered to initiate the synchronization procedure (state rtrnsp in FIG. 6 and state xtrnsp in FIG. 4). At time instant (b), the originating end (modem 200) has been triggered to initiate the synchronization procedure (state rtrnsp in FIG. 5 and state xtrnsp in FIG. 7). Note that for SVD modems using a V.42 XID exchange to provide the trigger, the answering end will generally be triggered before the originating end is triggered.

At time instant (c), the answering-end demultiplexer has acquired synchronization (state ronesf in FIG. 6). At the start of its next frame, at time instant (d), the answering-end multiplexer begins to send the explicit synchronization pattern (state xxsync in FIG. 4).

At time instant (e), the originating-end demultiplexer has acquired synchronization (state rmux in FIG. 5). At the start of its next frame, at time instant (f), the originating-end multiplexer begins to send the pattern of framed 1-bits in state xonesf (FIG. 7).

At time instant (g), the answering-end demultiplexer has received the pattern of framed 1-bits for a sufficient number of frames (state rmux in FIG. 6). At the start of its next frame, at time instant (h), the answering-end multiplexer begins operation in normal TDM mode (state xmux in FIG. 4).

Figure 7:
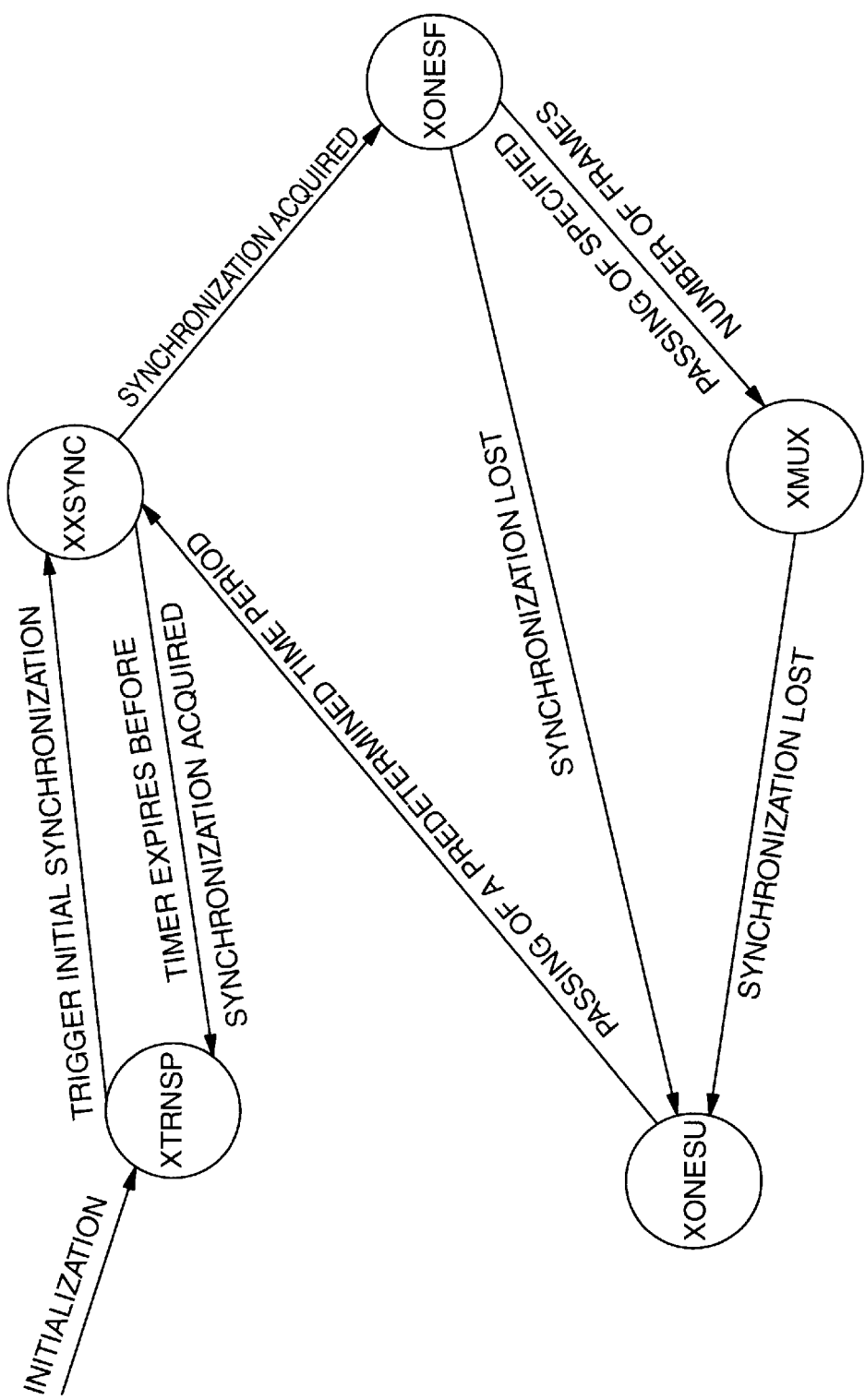
FIG. 7 illustrates a state diagram of an operation of an originating multiplexer.

At time instant (j), the originating-end multiplexer has finished sending the pattern of framed 1-bits for the appropriate number of frames and begins operation in normal TDM mode (state xmux in FIG. 7). At this point, normal, full-duplex TDM operation commences.

Recovery from Loss of Synchronization

As noted above, a demultiplexer determines that synchronization has been lost if a sufficiently large number of framing-bit errors have been detected, or if, at the answering end, the correct pattern is not received within the allotted time.

One characteristic of the synchronization mechanism being disclosed is that neither acquisition nor reacquisition of synchronization is attempted in the presence of random data. Rather, these processes always take advantage of the simplicity afforded by use of the explicit synchronization pattern. The strategy employed in the event of loss of synchronization is therefore as follows:

Once either end has lost synchronization, action is taken to insure that both ends have lost synchronization.

When the originating end is sure that both ends have lost synchronization, it initiates an explicit synchronization procedure. This procedure then follows the outline previously presented.

In particular:

1. If the answering-end (modem 201) demultiplexer determines that it has lost synchronization, it enters state rxsync (FIG. 6), and the answering-end multiplexer enters state xonesu (FIG. 4). Note that the bitstream transmitted in this state xonesu will force synchronization to be lost at the originating end (modem 200) (if this has not already happened).

2. If the originating-end (modem 200) demultiplexer determines that it has lost synchronization, it enters state rxsync (FIG. 5), and the originating-end multiplexer enters state xonesu (FIG. 7). Note that the bitstream transmitted in this state xonesu will force synchronization to be lost at the answering end (modem 201), within some time period known at both ends. At the end of this time period, the originating-end demultiplexer enters state rxsync (FIG. 5), and the originating-end multiplexer enters state xxsync (FIG. 7).

No matter which end lost synchronization first, when these steps are completed both ends are "back to square one," at the start of the explicit synchronization procedure. This procedure then follows its course exactly as for initial acquisition of synchronization.

Control Communication During Synchronization

A novel aspect of the mechanism being disclosed, as itemized earlier, is the maintenance of communication between control functions in the endpoints throughout the explicit synchronization process. This feature is extremely useful for recovery from various error conditions. For example:

The trigger to begin initial synchronization may be provided by a V.42 XID exchange. The XID command sent by the originating end (modem 200) is received at the answering end (modem 201), an XID response is sent in return, and the appropriate action is taken therein (at time instant (a) in FIG. 9). The XID response is corrupted and discarded by the originating end. The originating end will, after some time elapses, retransmit the XID command. The answering end (more precisely control function 305 at the answering end (modem 201)) must be able to receive this and retransmit the XID response in return.

Some local failure in either endpoint (for example, an error in initializing speech coder 303) stimulates the endpoint's control function to communicate with its peer, perhaps to terminate the synchronization procedure and return to transparent mode. The peer control function must be able to receive the communication and respond to it.

The control function 305 desiring to transmit can interrupt the multiplexer at its end and force it into transparent mode, at least temporarily (via control path 306 shown in FIG. 3). However, a receive path to the control function in the far-end device must be available at all times. This path is provided by leaving the entire received bitstream passed "upward" transparently in the two demultiplexer states associated with synchronization (rxsync and ronesj). The following is assumed:

1. A data path between control function 305 and mux/demux 302 exists in transparent mode. This same path is available for the "transparent reception" during synchronization described above.

2. Communication between control functions uses an HDLC frame format. In HDLC frame format, as described, for example, in ITU-T Recommendation Q.922, data packets are limited by "HDLC flags," i.e., the big pattern "01111110", and a mechanism called "zero-bit insertion" is employed to prevent a bit pattern within a data packet from being interpreted as a delimiter. Note that the bitstream passed to control function 305 during states rxsync and ronesf would therefore be seen by control function 305 to consist of idles (1-bits), abort sequences, and HDLC flags (in the explicit synchronization pattern). These cannot be misinterpreted as messages, even in the presence of bit errors.

It will be evident from the description above that the synchronization mechanism disclosed here requires that certain information be available in common at both ends of the connection; including:

timer values for state rxsync frame counts for states xonesf and ronesf the algorithm used in state rmux for determining when synchronization has been lost Timer and counter values can be exchanged by the endpoints as part of the trigger that begins initial synchronization; it is assumed that this may be a V.42 XID exchange, which is perfectly suited to supporting such a function. With respect to the third item listed, it is assumed that the synchronization procedure being disclosed would include as part of its definition a specific algorithm for determining when synchronization has been lost, with this algorithm based on counting correctly and incorrectly received framing bits. Several algorithms of this type exist in the prior art.

The disclosed mechanism was designed with a specific application (SVD modems) and associated set of requirements in mind as outlined above. Clearly, however, this disclosure is applicable to any TDM system having a similar set of requirements.

Although the present invention and its advantages have been described in detail, it should be understood that various changes, substitutions and alterations can be made herein without departing from the spirit and scope of the invention as defined by the appended claims.

What is claimed is:

1. A method for acquiring synchronization between a sending end and a receiving end coupled by a transmission link, in order to establish a communications path operating in a time-division multiplexing (TDM) mode, said method comprising the steps of:

1) sending from a sending end multiplexer to a receiving end demultiplexer a bit stream having embedded therein a recurring first predetermined bit pattern, said bit stream including the embedded bit pattern being the only bits sent to the receiving end multiplexer 2) acquiring synchronization by said receiving end demultiplexer with said sending end multiplexer by correctly recognizing said embedded first predetermined bit pattern;

3) responsive to acquiring synchronization at the receiving end demultiplexer sending a bit stream including said first predetermined bit pattern embedded therein from the receiving end multiplexer to the sending end demultiplexer;

4) acquiring synchronization by said sending end demultiplexer with said receiving end multiplexer when said sending end demultiplexer has correctly recognized said first predetermined bit pattern embedded in the received bit stream;

5) after acquiring synchronization at the sending end demultiplexer sending for a specified number of frames a second predetermined bit pattern which includes a predetermined framing channel bit pattern from said sending end multiplexer to said receiving end demultiplexer;

6) operating said sending end multiplexer in a normal TDM mode after completing step 5 set forth above: and 7) operating said receiving end demultiplexer in a normal TDM mode after receiving the specified number of frames of the second predetermined bit pattern.

2. The method as recited in claim 1, wherein said second predetermined bit pattern comprises all 1-bits except for said predetermined framing channel bit pattern.

3. The method as recited in claim 2, wherein said predetermined framing channel bit pattern comprises a 01010101 . . . pattern.

4. The method as recited in claim 1, further comprising the step of:

operating said receiving end multiplexer in said normal TDM mode after said receiving end demultiplexer has begun operating in said normal TDM mode.

5. The method as recited in claim 4, further comprising the steps of:

repeating steps 1)–5) if either said sending end demultiplexer or said receiving end demultiplexer determines that it has lost synchronization.

6. The method as recited in claim 1, wherein said second predetermined bit pattern comprises all 1-bits except for said predetermined framing channel bit pattern, and, wherein said first predetermined framing channel bit pattern comprises a 01010101 . . . pattern.

7. A method for reacquiring synchronization between a sending end and a receiving end, coupled by a transmission link and operating in a time-division multiplexing (TDM) mode, said method comprising the steps of:

determining by a near-end demultiplexer that it has lost synchronization;

in response to said determining step, sending from a near-end multiplexer to a far-end demultiplexer a bit pattern of all 1-bits for causing the far-end demultiplexer to also lose synchronization;

sending from the near-end multiplexer to said far-end demultiplexer a bit stream having a predetermined bit pattern; and acquiring synchronization by said far-end demultiplexer with said near-end multiplexer by correctly recognizing said predetermined bit pattern.

8. The method as recited in claim 7, further comprising the steps of:

in response to said step of acquiring synchronization by said far-end demultiplexer, sending said predetermined bit pattern from a far-end multiplexer to a near-end demultiplexer;

acquiring synchronization by said near-end demultiplexer with said far-end multiplexer when said near-end demultiplexer has recognized said predetermined bit pattern; and transitioning to normal multiplexed operation in response to said step of acquiring synchronization by said near-end demultiplexer.

9. The method as recited in claim 7, wherein said predetermined bit pattern is the only bit pattern on said transmission link.

10. A modem operable for communicating via telecommunications link to a receiving end modem using a time-division multiplexing (TDM) mode, said modem comprising:

a data pump adaptable for coupling to said communications link;

a sending end multiplexer coupled to said data pump;

a sending end demultiplexer coupled to said data pump;

synchronization circuitry comprising:

circuitry operable for causing said sending end multiplexer to send to a receiving end demultiplexer a bit stream having a first predetermined bit pattern;

circuitry operable for causing said sending end multiplexer to send, for a specified number of frames, a second bit pattern having all 1-bits except for a predetermined framing channel bit pattern to said receiving end demultiplexer; and circuitry operable for causing said sending end multiplexer to operate in a normal TDM mode after sending said specified number of frames having said second bit pattern to said receiving end demultiplexer.

11. The modem as recited in claim 10, wherein said predetermined framing channel bit pattern comprises a 01010101 . . . pattern.

12. The modem as recited in claim 10, wherein said modem is a simultaneous voice-data modem.

13. The modem as recited in claim 12, wherein said modem is coupled to a computer system.

14. The modem as recited in claim 13, wherein said modem is adaptable for coupling to a telephone system.

15. The modem as recited in claim 10, wherein said modem operates at a speed less than 160 kbits/sec.

16. A method for achieving synchronization between an originating end and an answering end in order to transmit information between said ends in a time-division multiplexing ("TDM") mode over a communications link, said method comprising the steps of:

sending from said originating end to said answering end a first predetermined pattern;

in response to said answering end recognizing said first predetermined bit pattern, sending said first predetermined bit pattern from said answering end to said originating end;

in response to said originating end recognizing said first predetermined bit pattern received from said answering end, sending for a specified number of frames, a second predetermined bit pattern from said originating end to said answering end with a predetermined framing channel bit pattern; and operating said originating end in a normal TDM mode after sending the specified number of frames including the second predetermined bit pattern.

17. A method for acquiring synchronization between a sending end and a receiving end coupled by a transmission link, in order to establish a communications path operating in a time-division multiplexing (TDM) mode, said method comprising the steps of:

sending from a sending end multiplexer to a receiving end demultiplexer a binary bit stream divided into a plurality of n bit frames in which a predetermined bit position of each frame is used to maintain synchronization once synchronization has been acquired, embedding in pairs of adjacent frames a recurring first bit pattern, said embedded first bit pattern including m bits in one state delimited by single bits in the other state, aligning a predetermined one of said delimiting bits with said predetermined bit position in one frame of the adjacent frame pair and setting the remaining 2*n−(m+2) bits in the adjacent frame pair to the one state; and acquiring synchronization by said receiving end demultiplexer with said sending end multiplexer by correctly recognizing said embedded first bit pattern.

18. The method set forth in claim 17 in which the two delimiting bits are set to binary zero and the remaining 2n−(m+2) bits in the pair of adjacent frames are set to binary one.

19. The method set forth in claim 18 in which the m bits are not greater than n−2.

20. The method set forth in claim 18 in which the embedded first bit pattern has the form 01111110 and the bits in the synchronization positions in adjacent frame pairs are different.

21. A method for acquiring synchronization between a transmitter and a receiver coupled by a transmission link, in order to establish a communications path operating in a time-division multiplexing (TDM) mode, said method comprising the steps of:

sending from the transmitter to the receiver a binary bit stream divided into a plurality of n bit frames in which at least one predetermined bit position of each frame is used to maintain synchronization once synchronization has been acquired, embedding within each pair of adjacent frames a first bit pattern, said embedded first bit pattern including m bits in a first state delimited by at least two bits in a second state, positioning a predetermined one of said delimiting bits with respect to said at least one predetermined bit position in one frame of the adjacent frame pair and setting the remaining bits in the adjacent frame pair to the first state; and acquiring synchronization by said receiving end demultiplexer with said sending end multiplexer by correctly recognizing said embedded first bit pattern.

* * * * *